United States Patent
Benchetrit et al.

(10) Patent No.: US 6,813,504 B2
(45) Date of Patent: Nov. 2, 2004

(54) DIALING USING INDIRECT ADDRESSING METHODS

(75) Inventors: Uri Benchetrit, Haifa (IL); Ayal Bar-David, Haifa (IL); Yoram Rimoni, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/057,170

(22) Filed: Jan. 25, 2002

(65) Prior Publication Data

US 2003/0144013 A1 Jul. 31, 2003

(51) Int. Cl.[7] .............................................. H04Q 7/20
(52) U.S. Cl. .................... 455/461; 455/414.1; 455/418; 455/564; 379/355.01
(58) Field of Search .............................. 455/461, 414.1, 455/418, 564, 445; 379/355.08, 355.01, 355.04, 355.05

(56) References Cited

U.S. PATENT DOCUMENTS

| 5,758,286 | A | * | 5/1998 | Leppanen | .................... 455/445 |
| 6,246,757 | B1 | * | 6/2001 | Cai et al. | ................. 379/114.2 |
| 2002/0186832 | A1 | * | 12/2002 | Mani | ..................... 379/355.01 |

* cited by examiner

Primary Examiner—Erika Gary
(74) Attorney, Agent, or Firm—Philip R. Wadsworth; Bruce W. Greenhaus; Gregory D. Ogrod

(57) ABSTRACT

A method for dialing a telephone number indirectly, including obtaining an alphanumeric identifier that is assigned to a telephone subscriber and associating the identifier with a destination telephone number of the telephone subscriber to form a mapping therebetween. The method further includes storing the mapping in a lookup table, dialing the identifier using an originating telephone, using the identifier as a pointer to the lookup table so as to recover the destination telephone number from the stored mapping, and establishing a connection between the originating telephone and a destination telephone via the destination telephone number.

9 Claims, 2 Drawing Sheets

DIALING USING INDIRECT ADDRESSING METHODS

FIELD OF THE INVENTION

The present invention relates generally to dialing a telephone number, and specifically to indirectly dialing the number.

BACKGROUND OF THE INVENTION

A telephone "line" has a unique telephone number, based on an international addressing recommendation E.164, associated with the line. Recommendation E.164, published by the International Telecommunication Union, Geneva, Switzerland, describes the number as comprising a country code, a national destination (or area) code and a subscriber number. In order to access the line, which may be connected to a communication device such as a landline telephone, a mobile telephone, or a facsimile machine, the unique number is dialed by a caller. Depending on the location of the caller in relation to the line, the caller may not need to dial the complete number in order to access the line. For example, a caller dialing from a mobile or landline telephone based in the United Kingdom, and dialing to a number in the United Kingdom, does not need to dial the country code "44" of the United Kingdom. Similarly, a caller in area code 212 in the United States does not need to dial either country code "1" or area code 212 if the caller is dialing from a telephone based in area code 212.

In the disclosure and in the claims, the term "dial" is assumed to refer to use of a rotary dial or a numeric keypad or other actuator which is able to convey signals representative of a telephone number. The term "dial" is also assumed to refer to voice dialing, where vocal sounds are transformed to signals representative of the telephone number.

Rather than dialing the unique number, or the part of the number, indirect dialing systems are known in the art. One such system uses letters which are already associated with numbers on the dial of a telephone, e.g., A, B, and C are associated with "2." A telephone number may thus be converted at least partly to letters, and the letters themselves may be used as a mnemonic and dialed. It will be appreciated that such indirect dialing systems use the existing E.164 number format in a transliterated form.

U.S. Pat. No. 5,949,868 to Hamano, whose disclosure is incorporated herein by reference, describes a call processing system for an intelligent network. The system includes a number translation table in a service exchange point which has dial numbers and corresponding translation numbers stored in the point. When a call is made to the service exchange point, the dial numbers and the translation numbers stored in the number translation table are accessed, and a translation number corresponding to the inputted call is generated. The dial numbers comprise 800 or 900 numbers, which are translated to local, typically 7-digit, numbers.

U.S. Pat. No. 6,275,574 to Oran, whose disclosure is incorporated herein by reference, describes a dial plan mapper which manages the translation between E.164 numbers and Internet hosts so as to provide voice over the Internet (VoIP) services. A dial string is received and predetermined match patterns, such as a four digit extension that does not start with 0, 9 or 8, corresponding to a local extension call in some private branch exchange (PBX) systems, are compared with the dial string. The dial plan mapper identifies the longest match of the dial string and outputs call configuration information associated with the identified match pattern.

The Internet Engineering Task Force, in conjunction with the International Telecommunication Union, has produced a standard, request for comments (RFC) 2916, which translates E.164 telephone numbers into IP addresses. RFC 2916, incorporated herein by reference, comprises a protocol and a database that maps telephone numbers to Internet domain names. RFC 2916 discusses the use of the Domain Name System (DNS) for storage of E.164 numbers, and how the DNS can be used for identifying available services connected to one E.164 number.

SUMMARY OF THE INVENTION

It is an object of some aspects of the present invention to provide a method and apparatus for indirect dialing of a telephone number.

In preferred embodiments of the present invention, a telephone number of a communication device is associated with an identifier of a user of the device. The identifier comprises any alphanumeric string, such as a social security number, a car license number, or a passport number, which is able to identify the user of the device. The association between the string and the telephone number is preferably generated by the user. Alternatively, the association is generated by an entity having knowledge of the string and the telephone number. Preferably, the string is able to uniquely identify the user. Alternatively, the string is able to identify a group of users which includes the user of the device.

The association is stored in a database. A caller who wishes to contact the user dials the identifier, which most preferably includes a prefix chosen from a group of prefixes, each prefix defining a type of string used as the identifier. A telephone network within which the caller is operating accepts the call, and, responsive to the prefix, accesses the database. Alternatively, rather than providing a group of prefixes, one prefix is implemented in the telephone network, and used by the caller, as a notification to access the database. If the string uniquely identifies the user, the database provides the telephone number of the communication device in response. In cases where the string identifies a group of users, the caller is queried by a server in the network so as to identify the user of the device, and after the identification the database provides the telephone number. The network then continues the process of placing the call in the standard manner. The caller is thus able to contact the communication device indirectly, without knowledge of the telephone number of the device.

The communication device may be any type of landline phone, mobile phone, facsimile machine, or any other apparatus which is dialable by the telephone number.

In some preferred embodiments of the present invention, the identifier comprises a car license number which is automatically read by an imaging system under control of the caller. Most preferably, the system dials the license number after reading the number.

There is therefore provided, according to a preferred embodiment of the present invention, a method for dialing a telephone number indirectly, including:

obtaining an alphanumeric identifier that is assigned to a telephone subscriber;

associating the identifier with a destination telephone number of the telephone subscriber to form a mapping therebetween;

storing the mapping in a lookup table;

dialing the identifier using an originating telephone; using the identifier as a pointer to the lookup table so as to recover the destination telephone number from the stored mapping; and establishing a connection between the originating telephone and a destination telephone via the destination telephone number.

Preferably, the originating telephone and the destination telephone each include a communication device chosen from a group of devices including a mobile telephone, a landline telephone, and a facsimile machine.

Further preferably, the destination telephone number includes a first string formatted in an industry-standard format, and the identifier includes a second string formatted differently from the industry-standard format.

Further preferably, the identifier includes an identifier-prefix and an identifier-string, wherein the identifier-prefix classifies a type of the identifier-string, and wherein the identifier-string is assigned by an entity associated with the type and independent of the telephone subscriber.

Further preferably, the entity includes an official body authorized to assign the identifier-string.

Preferably, the entity includes a credit card company, and the identifier-string includes a credit card number.

Further preferably, the identifier includes an identifier-prefix which acts as a notification that the identifier is not an industry-standard telephone number and that the method is to be invoked.

Preferably, the originating telephone is operative in a first communication network, and the destination telephone is operative in a second communication network.

Preferably, the alphanumeric identifier includes a string which acts as an identification of the telephone subscriber.

Alternatively or additionally, the alphanumeric identifier includes a string which acts as an identification of an object associated with the telephone subscriber.

Preferably, the identifier includes a car license number, and dialing the identifier includes forming an image of a car license plate and recovering the car license number from the image.

There is further provided, according to a preferred embodiment of the present invention, apparatus for dialing a telephone number indirectly, including:

a memory wherein is stored a lookup table including a mapping associating an alphanumeric identifier that is assigned to a telephone subscriber with a destination telephone number; and a communication server which is adapted to receive the identifier as a dialed input from an originating telephone, to access the lookup table responsive thereto, to recover the destination telephone number by using the identifier as a pointer to the lookup table, and to provide the destination telephone number to a communication network so as to enable the network to establish a connection between the originating telephone and a destination telephone via the destination telephone number.

Preferably, the originating telephone and the destination telephone each include a communication device chosen from a group of devices including a mobile telephone, a landline telephone, and a facsimile machine.

Preferably, the destination telephone number includes a first numeric string formatted in an industry-standard format, and the identifier includes a second numeric string formatted differently from the industry-standard format.

Preferably, the identifier includes an identifier-prefix and an identifier-string, wherein the identifier-prefix classifies a type of the identifier-string, and wherein the identifier-string is assigned by an entity associated with the type and independent of the telephone subscriber.

Further preferably, the entity includes an official body authorized to assign the identifier-string.

Alternatively or additionally, the entity includes a credit card company, and the identifier-string includes a credit card number.

Preferably, the identifier includes an identifier-prefix which acts as a notification that the identifier is not an industry-standard telephone number and that the method is to be invoked.

Preferably, the communication network includes a first communication network wherein the originating telephone is operative, and wherein the destination telephone is operative in a second communication network coupled to the first communication network.

Preferably, the identifier includes a numerical string which acts as an identification of the telephone subscriber.

Alternatively or additionally, the identifier includes a numerical string which acts as an identification of an object associated with the telephone subscriber.

Preferably, the identifier includes a car license number, and including an imaging system which is adapted to form an image of a car license plate, to recover the car license number from the image, and to convey the car license number to the communication server.

There is further provided, according to a preferred embodiment of the present invention, a method for dialing a telephone number indirectly, including:

obtaining an alphanumeric identifier that is assigned to a first and a second telephone subscriber;

associating the identifier with a first destination telephone number of the first telephone subscriber to form a first mapping therebetween;

associating the identifier with a second destination telephone number of the second telephone subscriber to form a second mapping therebetween;

storing the first and the second mapping in a lookup table;

dialing the identifier using an originating telephone;

using the identifier as a pointer to the lookup table so as to recover the first and the second destination telephone numbers from the stored mappings;

choosing one of the first and second destination telephone numbers as a desired destination telephone number; and establishing a connection between the originating telephone and a desired destination telephone via the desired destination telephone number.

Preferably, choosing one of the first and second destination telephone numbers includes requesting a caller dialing the identifier to choose between the telephone numbers.

There is further provided, according to a preferred embodiment of the present invention, apparatus for dialing a telephone number indirectly, including:

a memory wherein is stored a lookup table including a first mapping associating an alphanumeric identifier that is assigned to a first telephone subscriber with a first destination telephone number and a second mapping associating the alphanumeric identifier that is assigned to a second telephone subscriber with a second destination telephone number; and a communication server which is adapted to receive the identifier as a dialed input from an originating telephone, to access the lookup table responsive thereto, to recover the first and the second destination telephone numbers by using the identifier as a pointer to the lookup table, to request a caller dialing the identifier to choose a desired destination telephone number from the first and the second destination telephone numbers, and, responsive to the choice, to provide the desired destination telephone number to a communication network so as to enable the network to establish a connection between the originating telephone and a destination telephone via the desired destination telephone number.

The present invention will be more fully understood from the following detailed description of the preferred embodiments thereof, taken together with the drawings, in which:

DETAILED DESCRIPTION OF PREFERRED EMBODIMENTS

Figure 1:
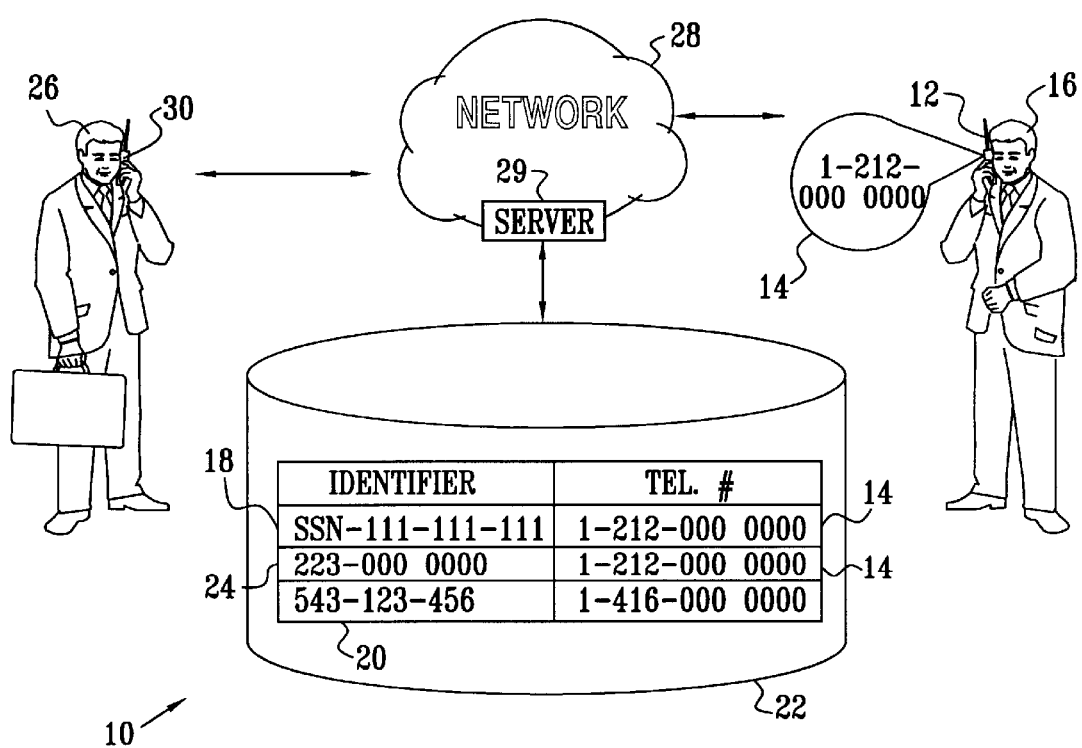
FIG. 1 is a schematic diagram illustrating operation of an indirect dialing system, according to a preferred embodiment of the present invention.

Reference is now made to FIG. 1, which is a schematic diagram illustrating operation of an indirect dialing system 10, according to a preferred embodiment of the present invention. A first communication device 12, for example a mobile telephone, may be contacted via a telephone number 14 supplied by a provider of the device, by methods known in the art. Device 12 is herein also termed the destination device or the destination telephone, and is assumed to be coupled to a telecommunication network 28. Telephone number 14, also herein termed the destination telephone number, comprises a number in an industry-standard E.164 format, described in the Background of the Invention, and network 28 supports use of numbers in this industry-standard format.

Preferably, a user 16 of the destination device informs an operator of network 28 of a mapping between the destination telephone number and an identifier 18 of the user. Alternatively, the operator is informed of the mapping by a person other than user 16 who is acquainted with both the destination telephone number and identifier 18 of the user. Identifier 18 may comprise any alphanumerical string associated with user 16. For example, the string may comprise a license number of a car driven by the user, a social security number of the user, a passport number of the user, a number of a credit card registered to the user, or any other type of number which may be used to identify user 16. Most preferably, the alphanumerical string is assigned to user 16 by an entity, independent of the user, which is authorized to issue the string. For example, the entity may be an official body such as a vehicle licensing authority which is authorized to issue a string as a car license number, or a ministry of social services which is authorized to issue a social security number. Alternatively, the entity may be a credit card company which is able to issue a credit card number. Other entities which are authorized and/or are able to issue types of numbers will be familiar to those skilled in the art. Typically, each type of string is associated with a corresponding object, for example, the license number is associated with the corresponding license plate, and the passport number is associated with the corresponding passport. It will be appreciated that the license number, the passport number, and other strings used as identifier 18, may include letters.

Identifier 18 most preferably also comprises a prefix to the string, the prefix serving to classify the type of identifier being stored. For example, if the identifier is a social security number, the prefix may be SSN or the numerical equivalent of SSN, i.e., 776. It will be appreciated that identifier 18 is in a format different from the industry-standard format of telephone number 14. Alternatively, one prefix is used as an indicator to network 28 that an indirect dialing method is being invoked, and that the number dialed is not an industry-standard telephone number. The mapping between identifier 18 and telephone number 14 is stored within a lookup table 20 in a memory 22, the memory being accessible to a communication server 29 comprised in network 28.

Lookup table 20 may comprise other mappings between identifiers and destination telephone numbers. For example, user 16 may inform the operator of system 10 of another identifier 24 of the user, so that table 20 comprises a first mapping between identifier 18 and the destination telephone number, and a second mapping between identifier 24 and the destination telephone number. Furthermore, table 20 typically comprises mappings, substantially similar to those described above for user 16, for other users of system 10.

A caller 26 uses a second communication device 30 to communicate with telecommunication network 28. Typically, device 30 comprises a mobile telephone, a land-line telephone, or a voice over Internet (VOIP) connection, to communicate with the network. Device 30 is herein also termed the originating device or originating telephone. Caller 26 wishes to contact user 16 of destination device 12, and uses originating telephone 30 to dial one of the identifiers of the destination device, herein assumed to be identifier 18. Network 28 recognizes identifier 18 as a dialed input which is not in the industry-standard format used by the network, for example, by noting the identifier's prefix, and routes the dialed identifier to server 29. The server uses memory 22 to look up telephone number 14 using identifier 18 as a pointer within table 20, and provides the telephone number to network 28. Network 28 then completes the connection between originating device 30 and destination device 12, substantially as if caller 26 had dialed telephone number 14.

It will be appreciated that in order for caller 26 to communicate efficiently with user 16 via device 12, caller 26 is preferably conversant with at least one specific identifier associated with the device. Some types of identifiers, such as car license numbers, may be available publicly. Other types of identifiers, such as a social security number, may be restricted in availability, but may be known to caller 26, for example, by user 16 providing the social security number to the caller.

It will also be appreciated that certain types of identifiers, such as car license numbers, may need to be further identified so as to avoid ambiguity. For example, a license number may be repeated in more than one state or region of a country. When such ambiguity may occur, most preferably one or more extra characters, corresponding to the state or region in the case of car license numbers, are added to form the identifier. Alternatively or additionally, in the case of ambiguity server 29 recognizes from accessing table 20 that an ambiguity exists. The server then informs caller 26 of the ambiguity, and attempts to clarify the ambiguity by informing the caller of possible choices. For example, if identifier 18 is a car license number without a prefix identifying the state, server 29 may inform caller 26 of multiple entries in table 20, and ask the caller to choose between states, or between area codes of the ambiguous entries.

Figure 2:
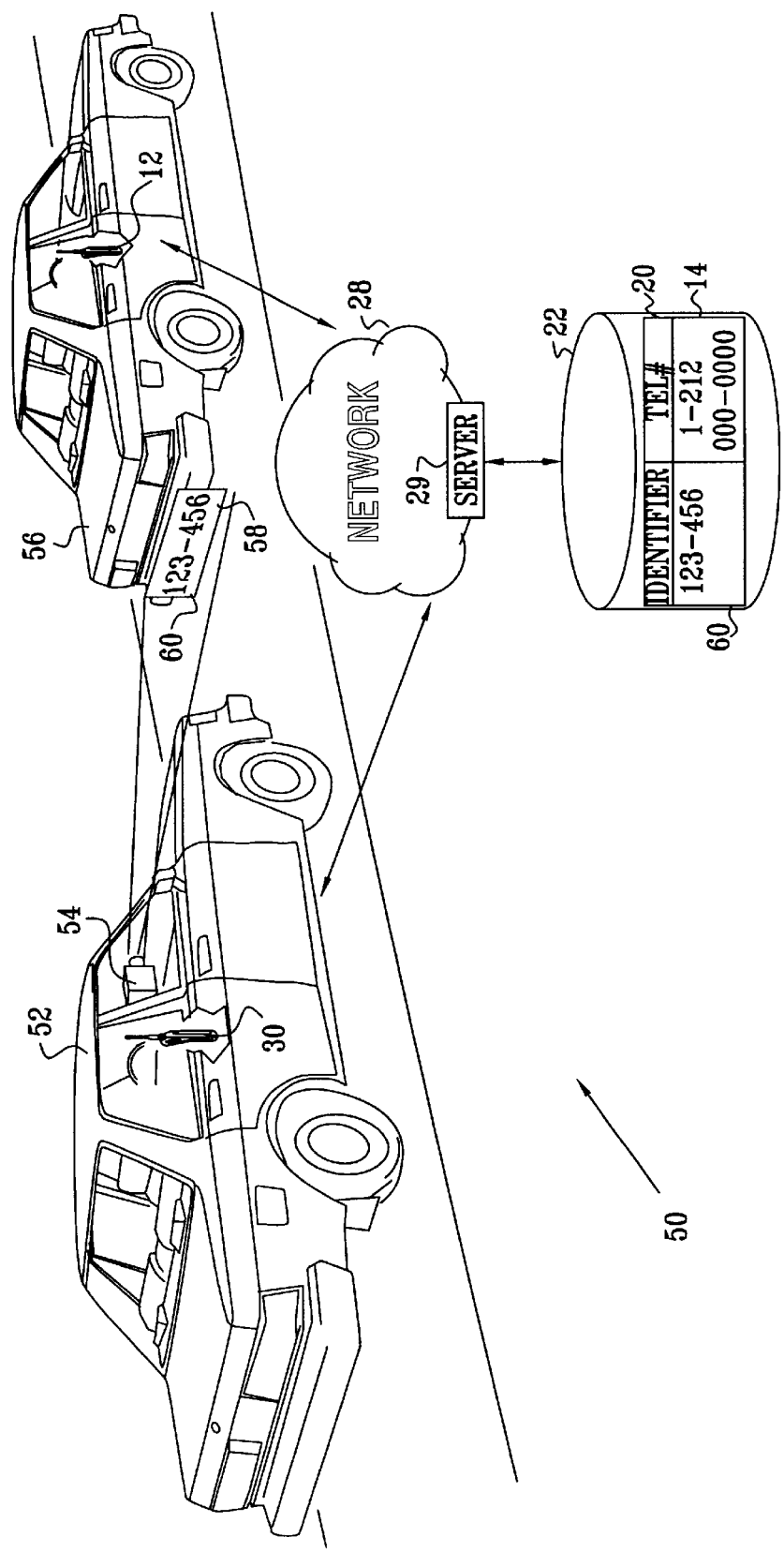
FIG. 2 is a schematic diagram illustrating operation of an alternative indirect dialing system, according to a preferred embodiment of the present invention.

FIG. 2 is a schematic diagram illustrating operation of an alternative indirect dialing system 50, according to a preferred embodiment of the present invention. Apart from the differences described below, the operation of system 50 is generally similar to that of system 10, so that elements indicated by the same reference numerals in both systems 50 and 10 are generally identical in construction and in operation. Caller 26, using communication device 30, is a first driver of a car 52. User 16, using communication device 12, is a second driver of a car 56. (For clarity, neither caller 26 nor user 16 are shown in FIG. 2). User 16 provides a license number 60 of car 56 to the operator of network 28, the license number serving as an identifier for communication device 12. License number 60 and telephone number 14 of communication device 12 are stored as a mapping in lookup table 20 in memory 22. The first driver (caller 26) wishes to call the second driver (user 16).

Car 52 comprises an imaging system 54, which is able to image and isolate a car license plate 58 of car 56, and which is able to recover license number 60 from the image. Such systems are well known in the imaging art. In order to call the second driver, the first driver activates imaging system 54, which images plate 58 and recovers license number 60 from the image.

System 54 is coupled to communication device 30. After recovering license number 60, system 54 activates device 30 and provides the recovered license number to the device. Device 30 in turn dials license number 60, with appropriate prefixes as necessary, so that the dialed number appears to network 28 as an identifier. Network 28 receives the dialed identifier and routes it to server 29, which accesses table 20 to determine telephone number 14. Server 29 provides network 28 with the number in order to place a call to device 12 in car 56, substantially as described above with reference to system 10. When the second driver accepts the call in device 12, devices 12 and 30 are connected by network 28 and the first and second drivers are able to communicate via the devices.

The description of systems 10 and 50 has assumed that devices 12 and 30 are operative in one communication network 28. It will be appreciated, however, that communication devices 12 and 30, in systems 10 and/or 50, may be operative in separate communication networks which couple together in order for the devices to communicate, by methods known in the art. For example, communication device 12 may comprise a landline telephone operative within a public switched telephone network (PSTN), and communication device 30 may comprise a mobile telephone operative within a cellular network. The scope of the present invention thus comprises communication devices operative in one or more communication networks.

It will be appreciated that lookup table 20 may be comprised of more than one sub-table, the sub-tables being coupled together so that mappings between identifiers and telephone numbers may be stored, and so that a specific identifier may be used as a pointer to recover the respective telephone number associated with the identifier. Similarly, memory 22 may be comprised of more than one sub-memory which may be localized with respect to network 28 or remote from the network. Furthermore, table 20 may be stored in a centralized form within memory 22, or in a distributed form within the sub-memories.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for dialing a telephone number indirectly, comprising:

obtaining an alphanumeric identifier that is assigned to a telephone subscriber, wherein the identifier comprises an identifier-prefix and an identifier-string, wherein the identifier-prefix classifies a type of the identifier-string, and wherein the identifier-string is assigned by an entity associated with the type and independent of the telephone subscriber, wherein the entity comprises a credit card company, and wherein the identifier-string comprises a credit card number;

associating the identifier with a destination telephone number of the telephone subscriber to form a mapping there between;

storing the mapping in a lookup table;

dialing the identifier using an originating telephone;

using the identifier as a pointer to the lookup table so as to recover the destination telephone number from the stored mapping; and establishing a connection between the originating telephone and a destination telephone via the destination telephone number.

2. A method for dialing a telephone number indirectly, comprising:

obtaining an alphanumeric identifier that is assigned to a telephone subscriber, wherein the identifier comprises a car license number, and wherein dialing the identifier comprises forming an image of a car license plate and recovering the car license number from the image;

associating the identifier with a destination telephone number of the telephone subscriber to form a mapping there between;

storing the mapping in a lookup table;

dialing the identifier using an originating telephone;

using the identifier as a pointer to the lookup table so as to recover the destination telephone number from the stored mapping; and establishing a connection between the originating telephone and a destination telephone via the destination telephone number.

3. Apparatus for dialing a telephone number indirectly, comprising:

a memory wherein is stored a lookup table comprising a mapping associating an alphanumeric identifier that is assigned to a telephone subscriber with a destination telephone number, wherein the identifier comprises an identifier-prefix and an identifier-string, wherein the identifier-prefix classifies a type of the identifier-string, and wherein the identifier-string is assigned by an entity associated with the type and independent of the telephone subscriber, wherein the entity comprises a credit card company, and wherein the identifier-string comprises a credit card number;

and a communication server which is adapted to receive the identifier as a dialed input from an originating telephone, to access the lookup table responsive thereto, to recover the destination telephone number by using the identifier as a pointer to the lookup table, and to provide the destination telephone number to a communication network so as to enable the network to establish a connection between the originating telephone and a destination telephone via the destination telephone number.

4. Apparatus for dialing a telephone number indirectly, comprising:

a memory wherein is stored a lookup table comprising a mapping associating an alphanumeric identifier that is assigned to a telephone subscriber with a destination telephone number, wherein the identifier comprises a car license number;

a communication server which is adapted to receive the identifier as a dialed input from an originating telephone, to access the lookup table responsive thereto, to recover the destination telephone number by using the identifier as a pointer to the lookup table, and to provide the destination telephone number to a communication network so as to enable the network to establish a connection between the originating telephone and a destination telephone via the destination telephone number; and an imaging system which is adapted to form an image of a car license plate, to recover the car license number from the image, and to convey the car license number to the communication server.

5. A method for dialing a telephone number indirectly, comprising:

obtaining an alphanumeric identifier that is assigned to a first and a second telephone subscriber;

associating the identifier with a first destination telephone number of the first telephone subscriber to form a first mapping there between;

associating the identifier with a second destination telephone number of the second telephone subscriber to form a second mapping there between;

storing the first and the second mapping in a lookup table;

dialing the identifier using an originating telephone;

using the identifier as a pointer to the lookup table so as to recover the first and the second destination telephone numbers from the stored mappings;

choosing one of the first and second destination telephone numbers as a desired destination telephone number; and establishing a connection between the originating telephone and a desired destination telephone via the desired destination telephone number.

6. A method according to claim 5, wherein choosing one of the first and second destination telephone numbers comprises requesting a caller dialing the identifier to choose between the telephone numbers.

7. Apparatus for dialing a telephone number indirectly, comprising:

a memory wherein is stored a lookup table comprising a first mapping associating an alphanumeric identifier that is assigned to a first telephone subscriber with a first destination telephone number and a second mapping associating the alphanumeric identifier that is assigned to a second telephone subscriber with a second destination telephone number; and a communication server which is adapted to receive the identifier as a dialed input from an originating telephone, to access the lookup table responsive thereto, to recover the first and the second destination telephone numbers by using the identifier as a pointer to the lookup table, to request a caller dialing the identifier to choose a desired destination telephone number from the first and the second destination telephone numbers, and, responsive to the choice, to provide the desired destination telephone number to a communication network so as to enable the network to establish a connection between the originating telephone and a destination telephone via the desired destination telephone number.

8. An apparatus for dialing a telephone number indirectly, comprising:

means for obtaining an alphanumeric identifier that is assigned to a first and a second telephone subscriber;

means for associating the identifier with a first destination telephone number of the first telephone subscriber to form a first mapping there between;

means for associating the identifier with a second destination telephone number of the second telephone subscriber to form a second mapping there between;

means for storing the first and the second mapping in a lookup table;

means for dialing the identifier using an originating telephone;

means for using the identifier as a pointer to the lookup table so as to recover the first and the second destination telephone numbers from the stored mappings;

means for choosing one of the first and second destination telephone numbers as a desired destination telephone number; and means for establishing a connection between the originating telephone and a desired destination telephone via the desired destination telephone number.

9. An apparatus according to claim 8, wherein the means for choosing one of the first and second destination telephone numbers comprises means for requesting a caller dialing the identifier to choose between the telephone numbers.

* * * * *